(12) United States Patent
Sassin et al.

(10) Patent No.: US 10,497,939 B2
(45) Date of Patent: Dec. 3, 2019

(54) CATION-CONDUCTIVE CONFORMAL ULTRATHIN POLYMER ELECTROLYTES

(71) Applicants: Megan B. Sassin, Alexandria, VA (US); Jeffrey W. Long, Alexandria, VA (US); Debra R. Rolison, Arlington, VA (US)

(72) Inventors: Megan B. Sassin, Alexandria, VA (US); Jeffrey W. Long, Alexandria, VA (US); Debra R. Rolison, Arlington, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 300 days.

(21) Appl. No.: 14/527,058

(22) Filed: Oct. 29, 2014

(65) Prior Publication Data

US 2015/0118552 A1 Apr. 30, 2015

Related U.S. Application Data

(60) Provisional application No. 61/896,680, filed on Oct. 29, 2013.

(51) Int. Cl.
*H01M 4/66* (2006.01)
*H01M 4/62* (2006.01)
*H01M 4/36* (2006.01)
*H01M 4/04* (2006.01)

(52) U.S. Cl.
CPC ......... *H01M 4/624* (2013.01); *H01M 4/0466* (2013.01); *H01M 4/366* (2013.01); *H01M 4/622* (2013.01); *H01M 4/66* (2013.01)

(58) Field of Classification Search
CPC ........... H01M 4/66; H01M 4/04; H01M 4/13; H01M 4/139; H01M 4/80; H01M 4/624; H01M 4/366
See application file for complete search history.

(56) References Cited

U.S. PATENT DOCUMENTS

| | | | | |
|---|---|---|---|---|
| 3,918,989 A | * | 11/1975 | Gillman | H01M 4/621 141/1.1 |
| 5,100,532 A | * | 3/1992 | Roling | C09K 8/035 208/177 |
| 7,144,658 B2 | | 12/2006 | Long et al. | |

(Continued)

FOREIGN PATENT DOCUMENTS

KR 20130101459 A 9/2013

OTHER PUBLICATIONS

Sassin, Megan B. et al. 'Non-Line-of-Sight Deposition of Nanoscale Separator/Electrolytes for 3D All-Solid-State Batteries' ECS Meeting Abstracts, May 15, 2013 (in file, povided by Applicant).*

(Continued)

*Primary Examiner* — Alexander Usyatinsky
(74) *Attorney, Agent, or Firm* — US Naval Research Laboratory; Joseph T. Grunkemeyer

(57) ABSTRACT

A composite having an electrically conductive substrate and a polymer derived from a vinyl-containing siloxane monomer coating on the substrate. A method of electropolymerizing a vinyl-containing siloxane monomer to form a coating on an electrically conductive substrate.

27 Claims, 8 Drawing Sheets

(56) References Cited

U.S. PATENT DOCUMENTS

| | | | |
|---|---|---|---|
| 7,255,924 | B2 | 8/2007 | Long et al. |
| 8,795,885 | B2 | 8/2014 | Prieto et al. |
| 2005/0003271 | A1 | 1/2005 | Jiang et al. |
| 2005/0079420 | A1 | 4/2005 | Cho et al. |
| 2010/0320972 | A1* | 12/2010 | Tessier .................. C01B 25/30 320/137 |
| 2011/0027648 | A1* | 2/2011 | Rolison ................ H01M 4/131 429/209 |
| 2011/0104470 | A1* | 5/2011 | Anderson ............ C09D 183/04 428/221 |
| 2013/0157129 | A1 | 6/2013 | Uemura et al. |
| 2013/0196235 | A1* | 8/2013 | Prieto ................ H01M 4/0402 429/315 |
| 2014/0162135 | A1 | 6/2014 | Prieto et al. |
| 2014/0173889 | A1 | 6/2014 | Johnson et al. |
| 2014/0174954 | A1 | 6/2014 | Johnson et al. |

OTHER PUBLICATIONS

O'Shaughnessy et al, Langmuir (2006), 22(16), 7021-7026, CAS Abstract.*

O'Shaughnessy et al. Langmuir 2006, 22, 7021-7026.*

Achyuta et al., "Incorporation of Linear Spacer Molecules in Vapor-Deposited Silicone Polymer Thin Films" Macromolecules 2009, 42, 1970-1978

Aresta et al., "Evidence of the filling of nano-porosity in SiO2-like layers by an initiated-CVD monomer" Microporous and Mesoporous Materials 151 (2012) 434-439.

Bélanger et al., "Electrografting: a powerful method for surface modification" Chem. Soc. Rev., 2011, 40, 3995-4048.

Burkey et al., "Structure and mechanical properties of thin films deposited from 1,3,5-trimethyl-1,3,5-trivinylcyclotrisiloxane and water" J. Appl. Phys. 93 5143-5150 (2003).

El-Enany et al., "In situ growth of polymer electrolytes on lithium ion electrode surfaces" Electrochemistry Communications 11 (2009) 2320-2323.

Gabriel et al., "Cathodic electrografting of acrylics: From fundamentals to functional coatings" Progress in Polymer Science 35 (2010) 113-140.

Gerbaldi et al., "All-solid-state lithium-based polymer cells for high-temperature applications" Ionics (2010) 16:177-786.

Hart et al., "3-D Microbatteries" Electrochemistry Communications 5 (2003) 120-123.

Hooper et al., "A Highly Conductive Solid-State Polymer Electrolyte Based on a Double-Comb Polysiloxane Polymer with Oligo(ethylene oxide) Side Chains" Organometallics, vol. 18, No. 17, (1999) 3249-3251.

Hou et al., "Electropolymerization of Sulfonated Phenol by Cyclic Voltammetry" J. Appl. Polym. Sci. (2013) 1151-1156.

Leroux et al., "Nanostructured Monolayers on Carbon Substrates Prepared by Electrografting of Protected Aryldiazonium Salts" Chem. Mater. 2013, 25, 489-495.

Liang et al., "Solid Polymer Electrolytes X: Preparation and Characterizations of Polyether-Siloxane, Organic-Inorganic, Hybrid Nanocomposites Complexed with Lithium Perchlorate" Journal of Polymer Science: Part B: Polymer Physics, vol. 42, 1928-1937 (2004).

Long et al., "Three-Dimensional Battery Architectures" Chem. Rev. 2004, 104, 4463-4492.

Long et al., "Architectural Design, Interior Decoration, and Three-Dimensional Plumbing en Route to Multifunctional Nanoarchitectures" Acc. Chem. Res. 2007, 40, 854-862.

Lytle et al., "Carbon Ductwork with NanometricWalls and Micron-to-Submicron Inner Diameters" ECS Journal of Solid State Science and Technology, 2 (10) M3078-M3083 (2013).

O'Shaughnessy et al., "Initiated Chemical Vapor Deposition of Trivinyltrimethylcyclotrisiloxane for Biomaterial Coatings" Langmuir 2006, 22, 7021-7026.

Palacin et al., "Molecule-to-Metal Bonds: Electrografting Polymers on Conducting Surfaces" ChemPhysChem 2004, 5, 1468-1481.

Rhodes et al., "Nanoscale Polymer Electrolytes: Ultrathin Electrodeposited Poly(Phenylene Oxide) with Solid-State Ionic Conductivity" J. Phys. Chem. B 2004, 108, 13079-13087.

Rhodes et al., "Charge insertion into hybrid nanoarchitectures: mesoporous manganese oxide coated with ultrathin poly(phenylene oxide)" Journal of Non-Crystalline Solids 350 (2004) 73-79.

Rhodes et al., "Direct Electrodeposition of Nanoscale Solid Polymer Electrolytes via Electropolymerization of Sulfonated Phenols" Electrochemical and Solid-State Letters, 8(11) A579-A584 (2005).

Rhodes et al., "Architectural integration of the components necessary for electrical energy storage on the nanoscale and in 3D" Nanoscale, 2011, 3, 1731.

Rolison et al., "Multifunctional 3D nanoarchitectures for energy storage and conversion" Chem. Soc. Rev., 2009, 38, 226-252.

Ruzmetov et al., "Electrolyte Stability Determines Scaling Limits for Solid-State 3D Li Ion Batteries" Nano Lett. 2012, 12, 505-511.

Tan et al., "Poly(ether amine) and cross-linked poly(propylene oxide) diacrylate thin-film polymer electrolyte for 3D-microbatteries" Electrochemistry Communications 12 (2010) 1498-1500.

Tan et al., "3-D microbattery electrolyte by self-assembly of oligomers" Solid State Ionics 198 (2011) 26-31.

Tanguy, "On the electropolymerization of methacrylonitrile and acrylonitrile as studied by CV, EQCM and EIS" Journal of Electroanalytical Chemistry 487 (2000) 120-132.

Valvo et al., "Electrochemical elaboration of electrodes and electrolytes for 3D structured batteries" J. Mater. Chem. A, 2013, 1, 9281.

Voccia et al., "Electrografting of thin polymer films: Three strategies for the tailoring of functional adherent coatings" Progress in Organic Coatings 55 (2006) 175-181.

Wang et al., "The Investigation of Electrochemical Properties and Ionic Motion of Functionalized Copolymer Electrolytes Based on Polysiloxane" ECS Transactions, 16 (35) 91-104 (2009).

U.S. Appl. No. 61/715,943, filed Oct. 19, 2012.

Sassin et al. "Non-line-of-sight deposition of nanoscale separator/electrolytes for 3D all-solid-state batteries" ECS Meeting Abstracts, vol. MA2013-01, No. 534 (May 15, 2013).

Search Report and Written Opinion in PCT/US14/62854 (dated Feb 4, 2015).

Seach Report in EP14858852.8 (dated Feb. 24, 2017).

* cited by examiner

CATION-CONDUCTIVE CONFORMAL ULTRATHIN POLYMER ELECTROLYTES

This application claims the benefit of U.S. Provisional Application No. 61/896,680, filed on Oct. 29, 2013. The provisional application and all other publications and patent documents referred to throughout this nonprovisional application are incorporated herein by reference.

TECHNICAL FIELD

The present disclosure is generally related to composites for use as electrodes.

DESCRIPTION OF RELATED ART

Conventional batteries comprise two opposing electrodes assembled in a 2D, coplanar configuration, separated by an electronically insulating layer that is infused with an ion-conducting liquid electrolyte. While providing for facile and inexpensive cell fabrication, the use of liquid electrolytes presents challenges in terms of safety and may limit performance in challenging operating environments. For example, the nonaqueous electrolytes used for state-of-the-art Li-ion batteries are toxic and flammable. In addition to contributing to safety concerns, electrolyte volatility restricts the temperature range over which batteries can be effectively operated. Such concerns have driven the development of a wide range of solid-state electrolytes over the past 40 years, with compositions that are broadly based on organic (polymeric) or inorganic (ceramic) components, or in some cases, organic-inorganic hybrids (Scrosati, *J. Appl. Electrochem.* 2, 231 (1972); Fergus, *J. Power Sources* 195, 4554 (2010)). Despite advancements in solid-state electrolytes, their principal drawback remains modest ionic conductivity that restrains power performance in the ultimate battery. The brittle nature of ceramic-type solid-state electrolytes may also limit their use in particular types of batteries, such as wound-cell configurations (Roberts et al., *J. Mater. Chem.* 21, 9876 (2011)).

Solid-state electrolytes will have their greatest impact when transitioning from the simple 2D cell designs that dominate conventional batteries to next-generation 3D designs in which the three critical battery components (anode, cathode, and separator/electrolyte) are reconstructed as interpenetrating networks (FIG. 1) (Long et al., *Chem. Rev.* 104, 4463 (2004)). In a 3D battery configuration, the interface between the cathode and anode is maximized, and the anode/cathode separation distance is minimized, thereby mitigating power limitations that would otherwise be imposed by modest ionic conductivity in the solid-state electrolyte. Although substantial progress has been made in 3D battery design and fabrication, a common roadblock to achieving a fully functioning 3D battery is the separator/solid-state electrolyte component, which must be: (i) conformal to the supporting electrode architecture; (ii) ultrathin, typically tens of nanometers to a few micrometers; (iii) pinhole-free; (iv) electronically insulating; (v) ionically conducting; and (vi) chemically and electrochemically stable (Long et al., *Chem. Rev.* 104, 4463 (2004); Rolison et al., *Chem. Soc. Rev.,* 38, 226 (2009); Arthur et al., *MRS Bull.* 36, 523 (2011)). These requirements, coupled with the complex geometry of most 3D battery architectures represent a significant challenge for fabrication methods that are commonly used (Liu et al., *J. Phys. Chem. C* (doi: 10.1021/jp4063302)). Fabrication methods that have been used to generate solid-state electrolytes include: radio-frequency (RF) magnetron sputtering (Bagetto et al., *J. Power Sources* 189, 402 (2009); Xu et al., *J. Mater. Res.* 25, 1507 (2010)), physical vapor deposition (PVD) and pulsed-laser deposition (PLD) (Oudenhoven et al., *Adv. Energy Mater.* 1, 10 (2011)), chemical vapor deposition (CVD) (Oudenhoven et al., *Adv. Energy Mater.* 1, 10 (2011)), atomic layer deposition (ALD) (Liu et al., *J. Phys. Chem. C* (doi: 10.1021/jp4063302); Oudenhoven et al., *Adv. Energy Mater.* 1, 10 (2011); Knoops et al., *J. Vac. Sci. Technol. A* 30, 010801 (2012)), layer-by-layer (LBL) assembly (Nguyen et al., *Chem. Mater.* 23, 2142 (2011)), and film casting of polymer solutions (Tan et al., *Electrochem. Comm.* 12, 1498 (2010)). Many of these techniques, while effective for deposition on planar substrates, are ill-suited for deposition under the non-line-of-sight conditions imposed by the complex 3D architectures of interest for advanced solid-state battery designs.

Electrodeposition is a non-line-of-sight fabrication method that circumvents the aforementioned issue with regard to modifying complex 3D substrates, and under controlled growth conditions produces nano scale, conformal-to-the-surface, pinhole-free, electronically insulating polymer coatings (FIG. 2) (Rolison et al., *Chem. Soc. Rev.,* 38, 226 (2009); Arthur et al., *MRS Bull.* 36, 523 (2011); Oudenhoven et al., *Adv. Energy Mater.* 1, 10 (2011). It has been demonstrated that electro-oxidative polymerization of phenol-based monomers generates ultrathin (tens of nanometers), conformal polymer coatings on both planar substrates (Rhodes et al., *J. Phys. Chem. B* 108, 13079 (2004); Rhode et al., *Electrochem. Solid-State Lett.* 8, A579 (2005)) and 3D architectures (Lytle et al., *SPIE: Micro- and Nanotechnology Sensors, Systems, and Applications III,* 8031 (2011)). As-deposited polymer coatings are highly electronically insulating, with dielectric strengths comparable to those measured for the corresponding bulk polymer. Ionic conductivity is imparted by impregnation of the polymer film with electrolyte salts or by copolymerizing with monomers that have pendant ionic functionalities.

BRIEF SUMMARY

Disclosed herein is a composite comprising: an electrically conductive substrate, and a coating on the substrate comprising a polymer derived from a vinyl-containing siloxane monomer.

Also disclosed herein is a method comprising: providing an electrically conductive substrate, and electropolymerizing a vinyl-containing siloxane monomer to form a coating on the substrate.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

Figure 1:
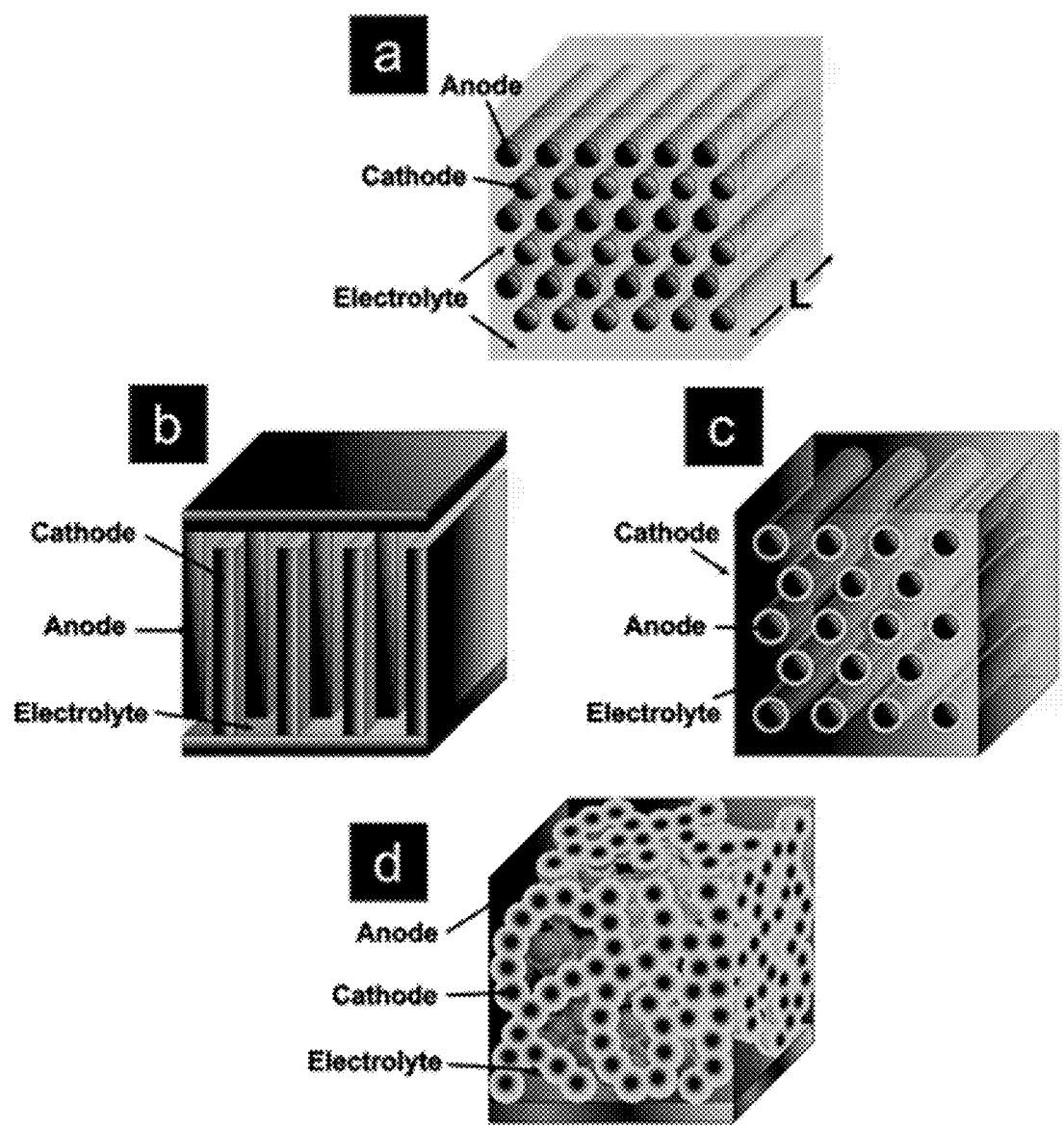
FIG. 1 schematically shows various 3D battery designs.
Figure 2:
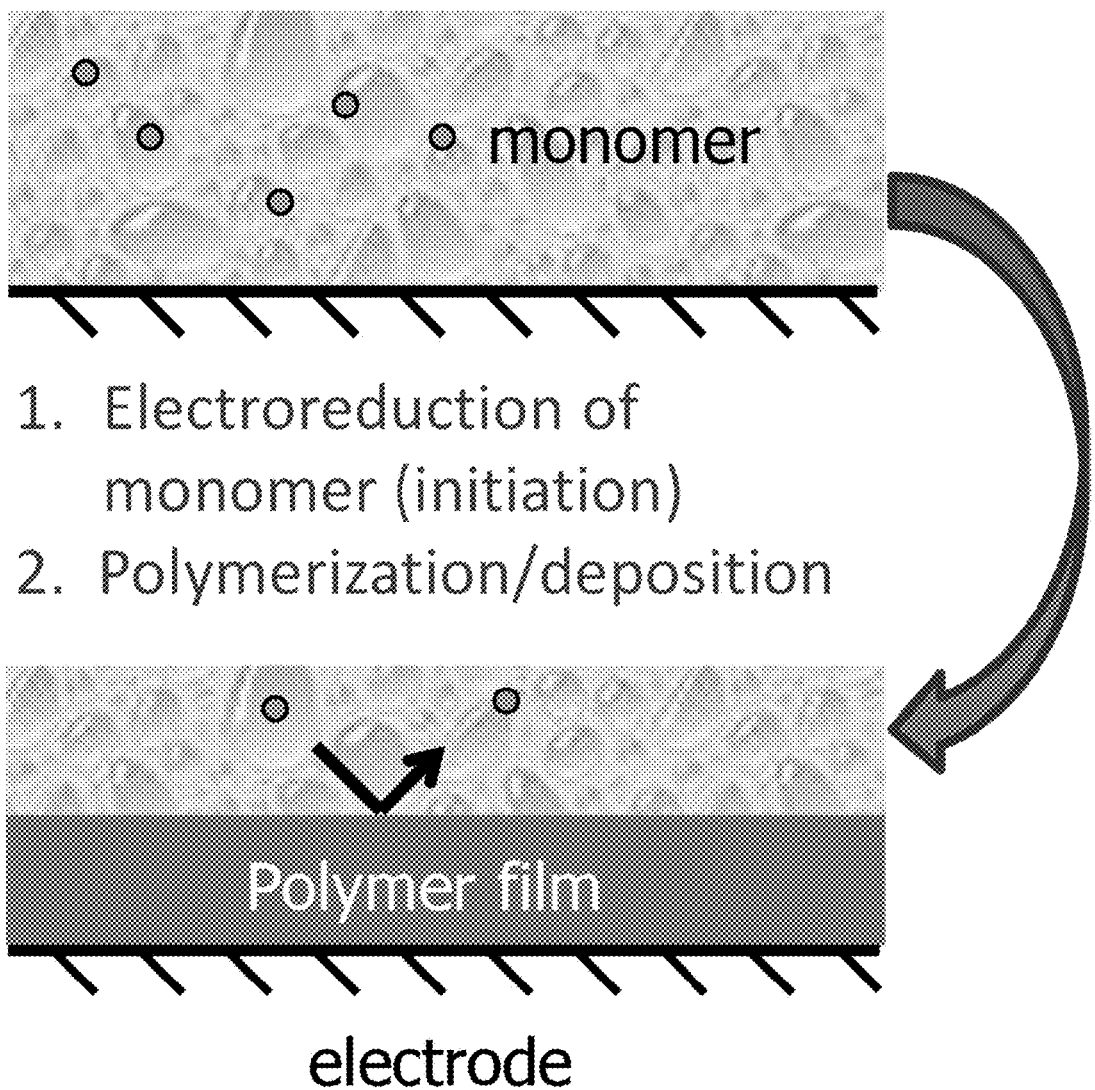
FIG. 2 schematically shows electropolymerization at a conductive substrate from contacting a monomer solution/electrolyte.

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Disclosed herein are ultrathin, electronically insulating polymer coatings directly generated on planar two-dimensional (2D) and macroscopically thick (e.g., at least 50 μm, 1 mm, or 10 mm) porous three-dimensional (3D) conductive substrates via electro-reductive electropolymerization of vinyl-containing siloxane monomers, such as 1,3,5-trivinyl-1,3,5-trimethylcyclotrisiloxane (see structure below). Under electrografting conditions, the polymer can deposit as a conformal nanoscale film (100 nm thick or less) that covalently bonds to the conductive substrate. Subsequent application of potentials more negative than the electrografting potential yields a micrometers-thick film. Enhancements in the functionality of the polymer coating are obtained through incorporation of cations into the polymer matrix, enabling it to function as both separator and solid-state electrolyte in electrical energy-storage devices.

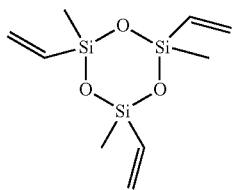

Polymer formation via electro-oxidation may be incompatible with electrode architectures that serve as the negative electrode of some 3D batteries, because corrosion or overoxidation of the conductive scaffold may occur. Accordingly, polymer deposition via electro-reduction of siloxane-based monomers with pendant vinyl groups are is herein. For example, siloxane-based polymer films were electrodeposited onto a variety of conductive substrates in contact with nonaqueous solutions of the commercially available monomer, 1,3,5-trivinyl-1,3,5-trimethylcyclotrisiloxane ($V_3D_3$). Related siloxane-based polymer electrolytes, prepared by more conventional synthetic methods, demonstrate such desirable attributes as low electronic conductivity, resistance to oxidation, and high dielectric strength, but must typically be modified to improve ionic conductivity (Rossi et al., *Polym. Int.* 58, 267 (2009)). In the present case, the ether groups intrinsic to the $V_3D_3$ monomer and other siloxane monomers promote $Li^+$ solvation and transport in the resulting electrodeposited polymer, imparting sufficient ionic conductivity to function as a solid-state separator/electrolyte. This protocol was initially used with planar substrates (carbon films, Cu and Zn foils), but electropolymerization of $V_3D_3$ on more complex substrates, such as Cu mesh, carbon-coated silica fiber paper, and Zn sponges has also been demonstrated.

Electropolymerization is a scalable fabrication method for generating thin polymer coatings on complex conductive substrates. Extending electropolymerization protocols to monomers such as $V_3D_3$ yields polymer coatings with chemical structures that are related to already proven siloxane-based bulk polymer electrolytes, and which should exhibit similar advantages in terms of chemical and thermal stability. When produced at nanoscale thickness and incorporated into a 3D battery configuration, such polymer electrolytes can minimize the power limitations that normally arise from the modest ionic conductivity of conventional solid-state electrolytes. Electropolymerization in the presence of the electrolyte salt of interest ($LiClO_4$ in this case) for the ultimate polymer electrolyte also eliminates additional steps (e.g., salt impregnation) that would be required to incorporate an electrolyte salt into the neutral polymer.

The composite is made by first providing an electrically conductive substrate. The substrate may range from a simple planar substrate to a porous 3D substrate that can accommodate an interpenetrating network of another material (FIG. 1). Suitable substrate materials include, but are not limited to, carbon, copper, nickel, aluminum, zinc, alloys and mixtures thereof, carbon-coated silica, and carbon-coated copper. The substrate may be a zinc sponge as disclosed in US Patent Appl. Pub. No. 2014/0147757 or U.S. application Ser. No. 14/501,629. The substrate may be any conductive material that is capable of lithiation. The substrate may be a monolithic structure and may have dimensions suitable for use as an electrode, or may comprise more than one monolithic structure directly or indirectly in electrical connection to each other. A conductive powder or other particles without electrical conductivity connecting the particles to each other would not be a monolithic structure. When used in an electrochemical cell, each part of the substrate should be electrically connected to any current collector, or at least 90%, 75%, or 50% of any of the substrate material present should be so connected.

Optionally, the substrate may be treated or coated with a first material that is capable of cation insertion, such as lithiation. Such a material should not completely fill or obstruct a majority of the pores.

Next, one or more vinyl-containing siloxane monomers are electropolymerized to form a coating on the substrate. $V_3D_3$ is one suitable monomer. Other suitable monomers include, but are not limited to, bis(triethoxysilylethyl)vinylmethylsilane, 2-(divinylmethylsilyl)ethyltriethoxysilane, vinyltris(methylethylketoximino)silane, vinyltris(trimethylsiloxy)silane, vinyltrimethoxysilane, vinyltris(2-methoxyethoxy)silane, vinyltriisopropoxysilane, vinyltriisopropenoxysilane, methacryloxypropyltris(vinyldimethylsiloxy) silane, tetrakis(vinyldimethylsiloxy)silane, tris (vinyldimethylsiloxy)methylsilane, vinylmethylbis (trimethylsiloxy)silane, vinylmethyldiacetoxysilane, vinyltriacetoxysilane, and vinyltriethoxysilane. Such monomers have the chemical properties required to electropolymerize into a solid-state electrolyte, separator, and/or electron insulator.

The electropolymerization is done by submerging some or all of the substrate in the monomer and applying an appropriate voltage to initiate electropolymerization. At certain voltages, the polymer will be electrografted to the substrate, meaning that the polymer is bound to the substrate, rather than merely adsorbed to the substrate. The electropolymerization may be self-limiting, meaning that polymerization ceases at any location that reaches a thickness that prevents further electropolymerization due to the low electrical conductivity of the film hindering further initiation. The use of self-limiting electropolymerization may produce a coating having an average or maximum thickness of no more than 500, 200, 100, 50, or 20 nm, and/or which does not completely fill or obstruct a majority of the pores in the substrate. At more negative potentials, the low conductivity of the film may be overcome such that solution polymerization may occur, which may clog the pores in the substrate. Techniques such as atomic force microscopy may be used to evaluate the coating to determine whether the electropolymerization conditions produced the desired form of the coating, and the electropolymerization potential adjusted to produce the desired form if necessary.

The coated substrate may be used as the anode of a rechargeable lithium insertion battery or other type of battery. The pores may be filled with a material capable of lithiation that contacts the polymer coating, but not the conductive substrate. When used as a battery, electrical connections are formed between the electrodes, including the substrate and or cation-insertion materials and an electrical load. Electricity is then allowed to flow through the electrical connections and the electrical load. The polymer may be infiltrated with lithium or other ions, or the ions may be present during the electropolymerization.

The following examples are given to illustrate specific applications. These specific examples are not intended to limit the scope of the disclosure in this application.

Example 1

Substrates—
Planar 2D carbon substrates (Lytle et al., *ECS J. Solid-State Sci. Technol.* 2, M3078 (2013)) and zinc sponges (US Patent Appl. Pub. No. 2014/0147757) were prepared as described in the literature. Copper foil and mesh were procured from commercial vendors, degreased in acetone, and subsequently cleaned in 1 M $HNO_3$, rinsed with water, and dried at 160° C. in air prior to use. Zinc foil was procured from a commercial vendor and was degreased in acetone prior to use.

Example 2

Figure 3:
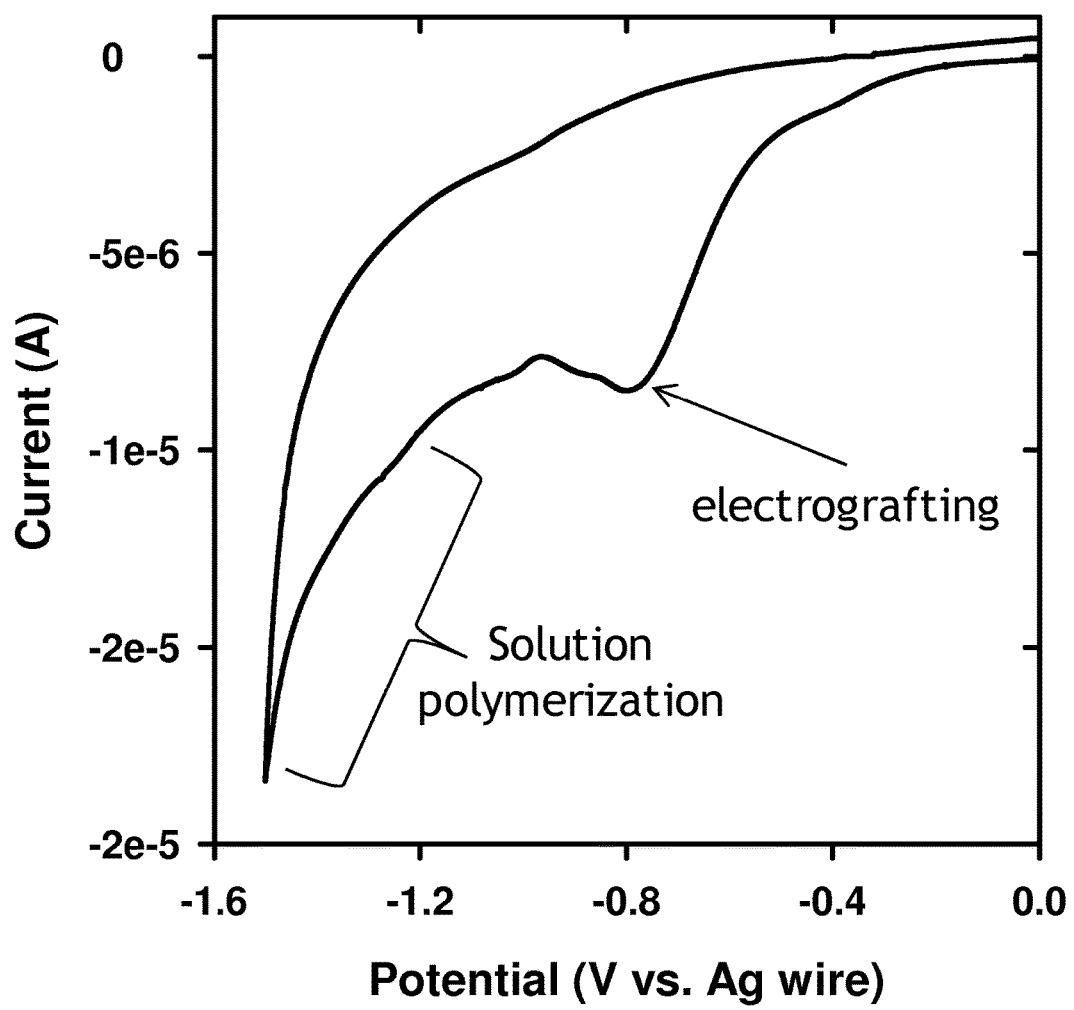
FIG. 3 shows cyclic voltammetry at a planar carbon substrate in 0.1 M $V_3D_3$ in 0.1 M TBAP dissolved in acetonitrile.

Electrochemically Initiated Polymerization—
Deposition was performed in a three-electrode electrochemical cell with a Ag wire reference electrode and a Pt counter electrode, placed inside a dry box saturated with $N_2$ gas. Substrates were exposed to solutions containing 0.1 M 1,3,5-trivinyl-1,3,5-trimethyl-cyclotrisiloxane monomer in 0.1 M electrolyte salt (tetrabutylammonium perchlorate (TBAP) or $LiClO_4$) in acetonitrile. Polymerization can be initiated via a number of electrochemical techniques including voltammetric, potentiostatic, galvanostatic, and potential- or current-pulsed methods. Ultrathin films (<20 nm) were deposited when the electrode was poised at or near the "grafting" region (FIG. 3), which for 1,3,5-trivinyl-1,3,5-trimethyl-cyclotrisiloxane in acetonitrile is ~−0.8 V vs. Ag. Subsequent application of potentials more negative of the grafting potential results in bulk polymerization of the solution near the electrode, the products of which were entangled in the grafted polymer matrix on the electrode. The polymerization process was self-limiting and terminated when the electrode was covered with the electronically insulating polymer film, shutting off polymerization pathways, resulting in lower currents with subsequent application of applied potential (FIG. 3). After polymer deposition, the electrode was removed from the monomer solution, rinsed with acetonitrile, and soaked in acetonitrile for a period of 4 to 24 h. Incorporation of lithium ions into polymer films deposited from TBAP electrolyte was accomplished by soaking in 1 M $LiClO_4$ in acetonitrile or water for 1 h, followed by soaking in neat acetonitrile for a period of 1 to 3 h. The polymer-coated electrodes were annealed under vacuum at temperatures ranging from 60° C. to 130° C. for 24 h to purge residual monomer and/or solvent from the polymer film.

Example 3

Figure 4:
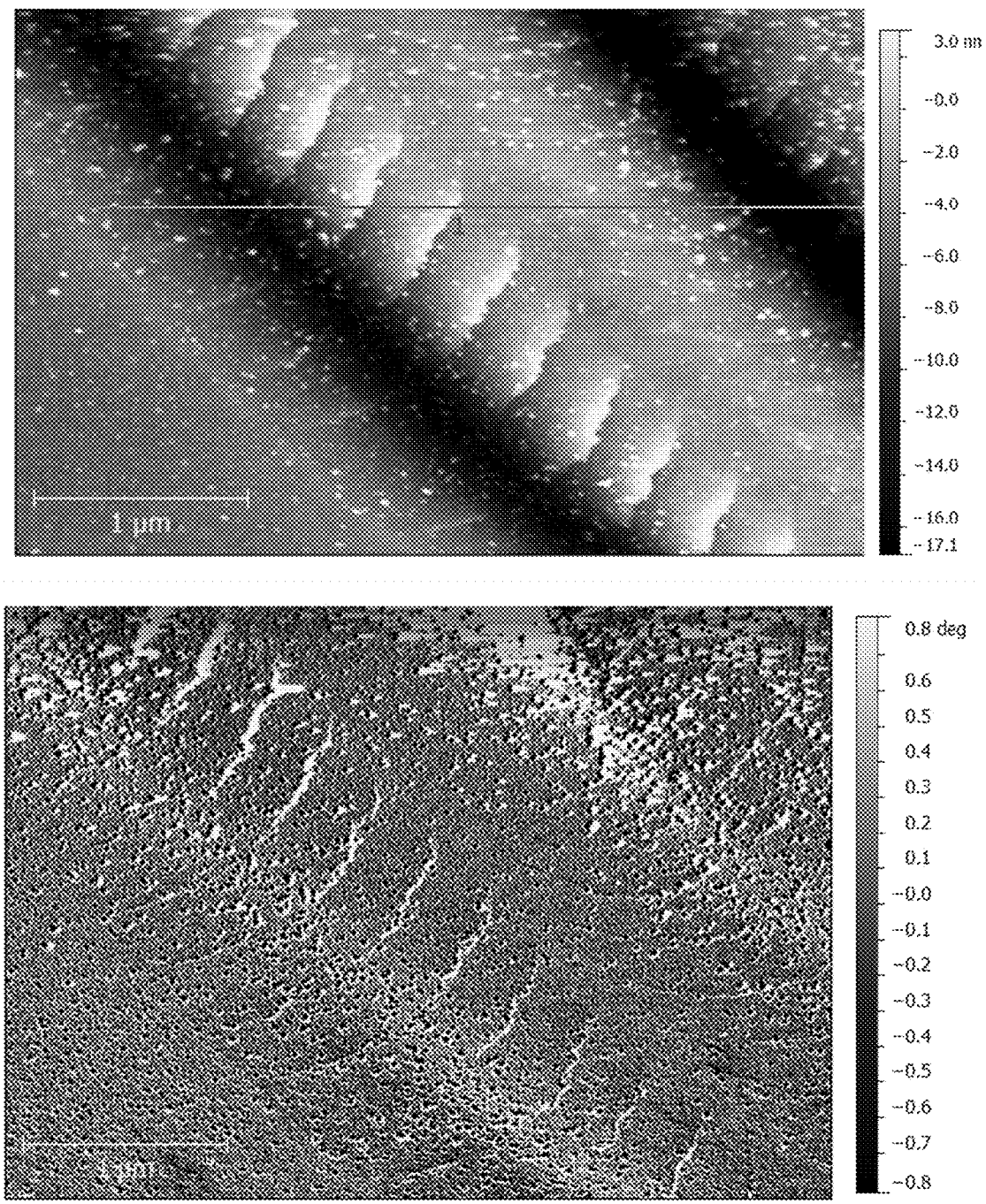
FIG. 4 shows atomic force micrographs of topography (top) and phase (bottom) of 2D planar carbon substrates coated poly($V_3D_3$).

Characterization of Morphology—
The morphology and thickness of the poly($V_3D_3$) film on planar substrates was examined by atomic force microscopy. Electropolymerization produced films that conformally coated the irregular surfaces of the carbon substrate and were homogeneous in composition (FIG. 4).

Example 4

Figure 5:
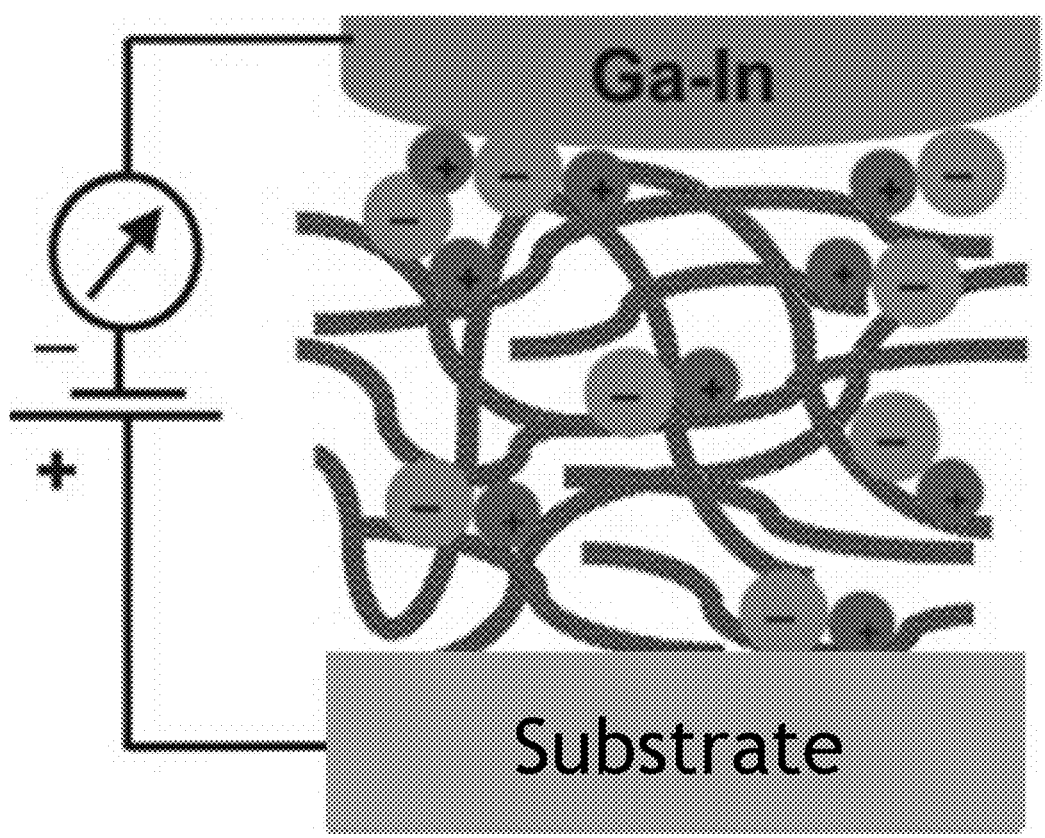
FIG. 5 schematically shows a solid-state electrical measurement setup.
Figure 6:
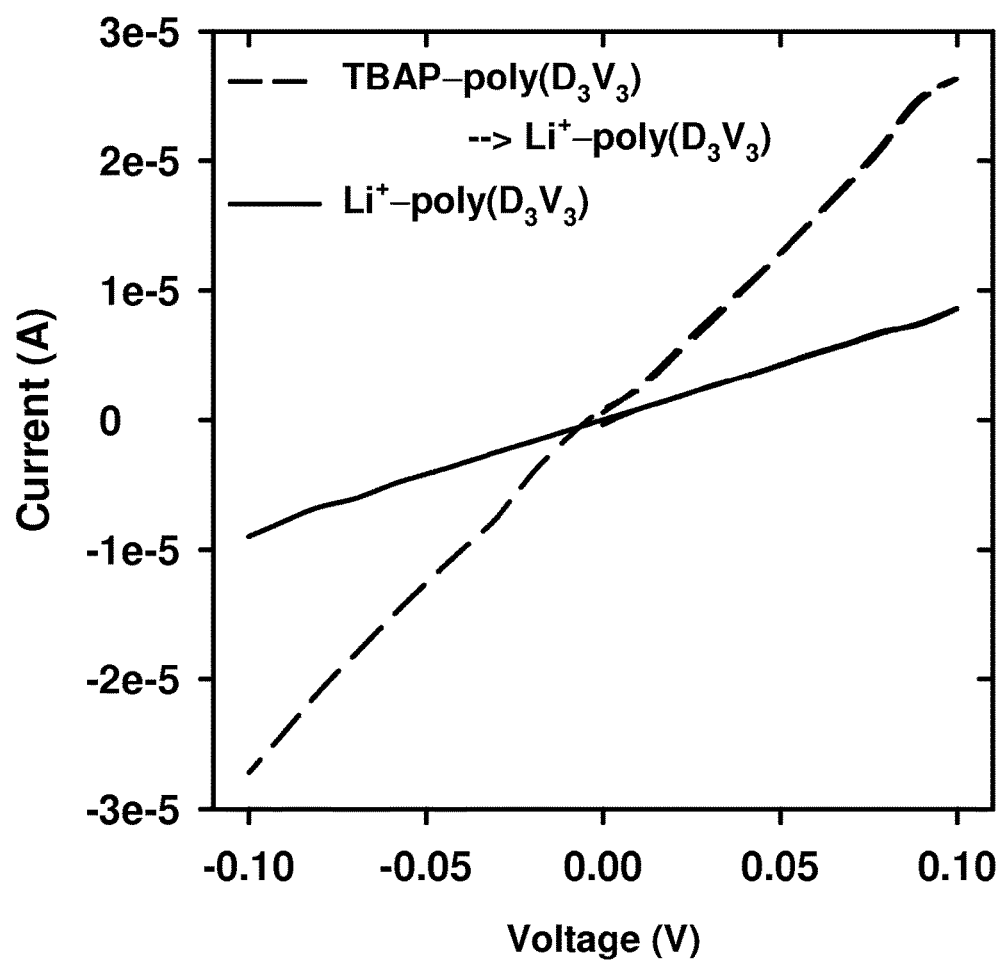
FIG. 6 shows solid-state i-V scans of TBAP-poly($V_3D_3$) converted to $Li^+$-poly($V_3D_3$) (- -) and directly deposited $Li^+$-poly($V_3D_3$) (-) on 2D planar carbon substrates.
Figure 7:
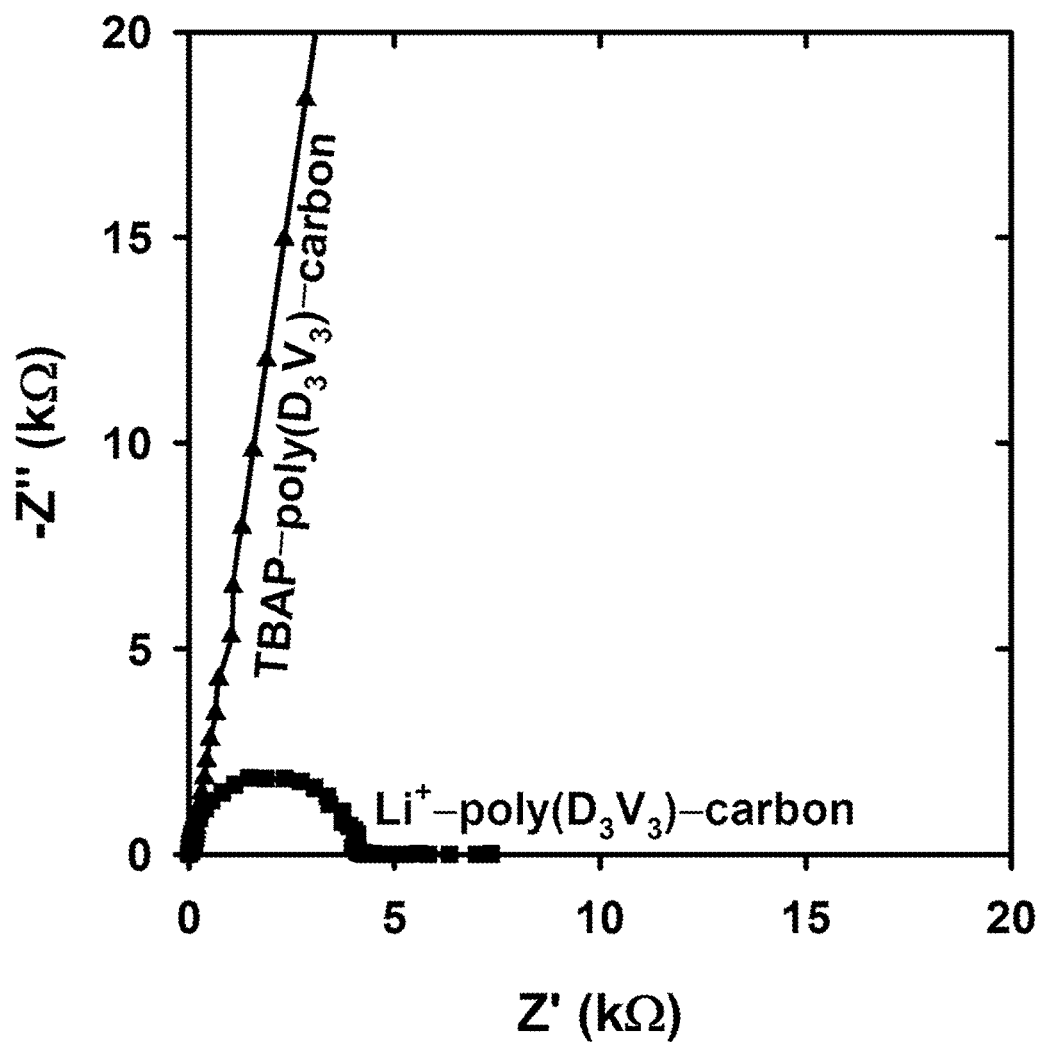
FIG. 7 shows a Nyquist plot of TBAP-poly($V_3D_3$) (▲) on a 2D planar carbon substrate and that same sample after incorporation of $Li^+$, denoted as $Li^+$-poly($V_3D_3$) (■).
Figure 8:
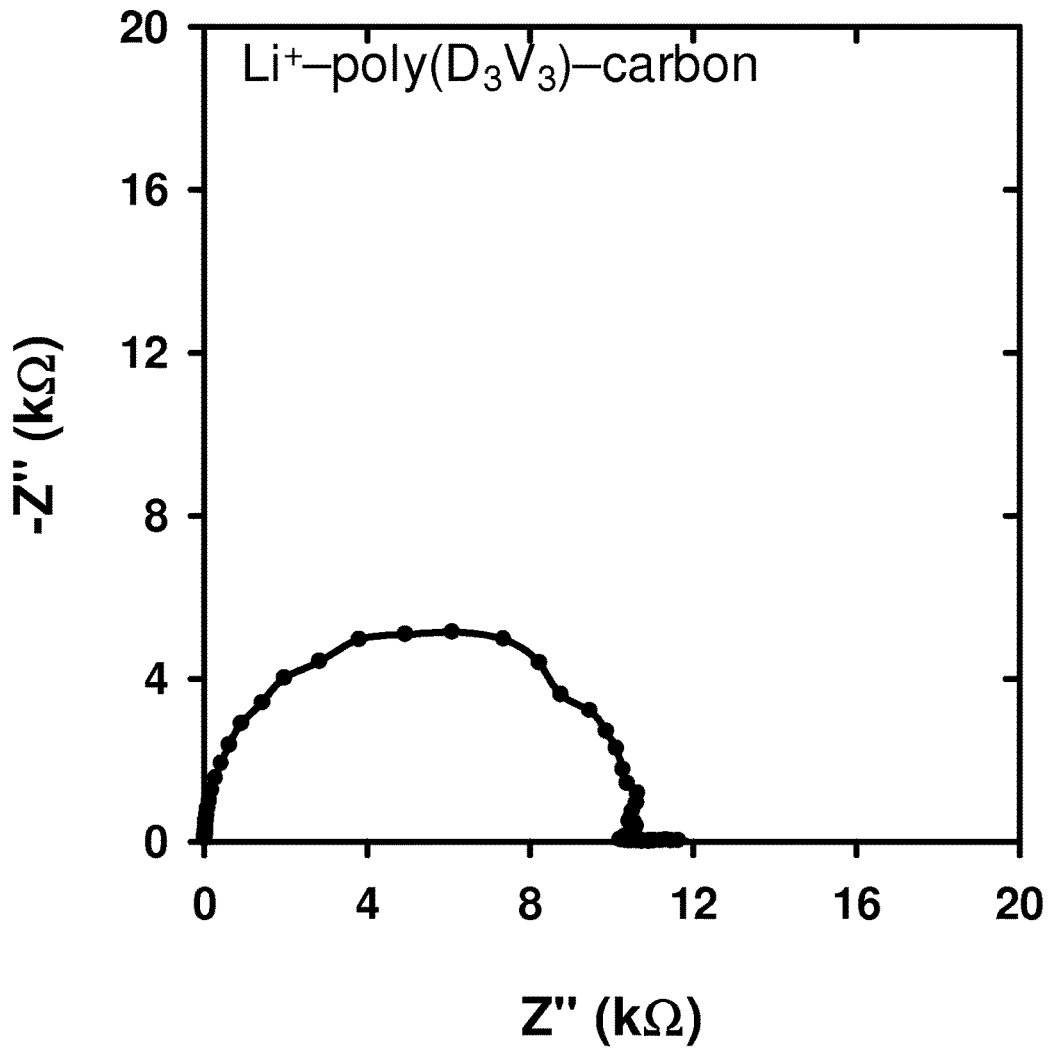
FIG. 8 shows a Nyquist plot of $Li^+$-poly($V_3D_3$) directly deposited on a on 2D planar carbon substrate.

Electrical Characterization—
Solid-state DC and AC electrical properties of the poly ($V_3D_3$) film were assessed at room temperature in an argon-filled glovebox with a potentiostat/galvanostat. Electrical contact to the poly($V_3D_3$) film was made with liquid gallium-indium eutectic or liquid mercury contacted to copper wire in a 1-mL plastic syringe (FIG. 5). The electronic conductivity of the polymer film was assessed with linear current-voltage scans from ±100 mV at 5 mV $s^{-1}$. The poly($V_3D_3$) film-coated samples exhibited ohmic behavior in this narrow voltage window (FIG. 6), regardless of whether Li ions were incorporated into the film during or after deposition. The electronic conductivity of both types of polymer films was ~$10^{-8}$ S $cm^{-1}$. Solid-state AC impedance measurements were made with an applied DC bias of 0 V and an AC voltage of +10 mV from 1 MHz to 100 Hz. The AC impedance of a non-Li ion containing poly($V_3D_3$) film displayed a response that is characteristic of a dielectric, as most of the electrolyte ions (TBAP) were easily removed during the post deposition rinsing steps (FIG. 7). Subsequent incorporation of Li ions into this same polymer film transformed the impedance response to one exhibiting ion-transfer resistance, confirming that the film functioned as a solid-state electrolyte with an ionic conductivity of $10^{-8}$ S $cm^{-1}$ (FIG. 7). The poly($V_3D_3$) film generated in the presence of Li ions exhibited an impedance response characteristic of a solid-state electrolyte with comparable ionic conductivity ($10^{-8}$ S $cm^{-1}$), revealing that the $Li^+$ ions were strongly incorporated into the polymer matrix and are not easily removed by post-deposition processing steps (FIG. 8).

Obviously, many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

What is claimed is:
1. A composite comprising:
    an electrically conductive substrate; and
    a coating comprising poly(1,3,5-trivinyl-1,3,5-trimethyl-cyclotrisiloxane) that is capable of ionic conductivity covalently bound to at least a portion of the substrate.

2. The composite of claim 1, wherein the polymer is made by self-limiting electropolymerization.

3. The composite of claim 1, wherein the polymer is electrografted to the substrate.

4. The composite of claim 1, wherein the substrate is planar.

5. The composite of claim 4, wherein the substrate comprises carbon, copper, nickel, aluminum, tin, zinc, or an alloy or mixture thereof.

6. The composite of claim 1;
wherein the substrate comprises pores; and
wherein the coating does not completely fill or obstruct a majority of the pores.

7. The composite of claim 6, wherein the substrate comprises carbon-coated silica or copper.

8. The composite of claim 6, wherein the substrate comprises a zinc sponge.

9. The composite of claim 6, wherein the coating has an average thickness of no more than 500 nm.

10. The composite of claim 6;
wherein the substrate further comprises a first material capable of cation insertion or lithiation; and
wherein the first material does not completely fill or obstruct a majority of the pores.

11. A battery comprising:
a negative electrode comprising the composition of claim 10; and
a positive electrode comprising a second material capable of cation insertion or lithiation within at least a portion of the pores and in contact with the coating.

12. A battery comprising:
a negative electrode comprising the composition of claim 6; and
a positive electrode comprising a material capable of cation insertion or lithiation within at least a portion of the pores and in contact with the coating.

13. A method comprising:
providing an electrically conductive substrate; and
electropolymerizing 1,3,5-trivinyl-1,3,5-trimethylcyclotrisiloxane to form a coating that is capable of ionic conductivity covalently bound to at least a portion of the substrate.

14. The method of claim 13, wherein the electropolymerization is self-limiting electropolymerization.

15. The method of claim 13, wherein the electropolymerization electrografts the polymer to the substrate.

16. The method of claim 13, wherein the substrate is planar.

17. The method of claim 16, wherein the substrate comprises carbon, copper, nickel, aluminum, tin, zinc, or an alloy or mixture thereof.

18. The method of claim 13;
wherein the substrate comprises pores; and
wherein the coating does not completely fill or obstruct a majority of the pores.

19. The method of claim 18, wherein the substrate comprises carbon-coated silica or copper.

20. The method of claim 18, wherein the substrate comprises a zinc sponge.

21. The method of claim 18, wherein the coating has an average thickness of no more than 500 nm.

22. The method of claim 18, wherein the substrate further comprises a first material capable of cation insertion or lithiation.

23. A method comprising:
providing the battery of claim 11;
forming electrical connections between an electrical load and the first material and the second material; and
allowing electricity to flow through the electrical connections and the electrical load.

24. The method of claim 18, further comprising:
infiltrating at least a portion of the pores with a second material capable of cation insertion or lithiation in contact with the coating.

25. A method comprising:
providing the battery of claim 12;
forming electrical connections between an electrical load and the substrate and the material; and
allowing electricity to flow through the electrical connections and the electrical load.

26. The composite of claim 1, wherein the coating comprises cations.

27. The composite of claim 1, wherein the coating comprises lithium ions.

* * * * *